(12) United States Patent
Saxena et al.

(10) Patent No.: US 12,249,121 B2
(45) Date of Patent: Mar. 11, 2025

(54) PATTERN RECOGNITION FOR IDENTIFYING INDISTINCT ENTITIES

(71) Applicant: INTERNATIONAL BUSINESS MACHINES CORPORATION, Armonk, NY (US)

(72) Inventors: Rajesh Kumar Saxena, Thane East (IN); Harish Bharti, Pune (IN); Pinaki Bhattacharya, Pune (IN); Sandeep Sukhija, Rajasthan (IN); Dinesh Wadekar, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 400 days.

(21) Appl. No.: 17/960,729

(22) Filed: Oct. 5, 2022

(65) Prior Publication Data

US 2024/0135678 A1  Apr. 25, 2024

(51) Int. Cl.
*G06V 10/764* (2022.01)

(52) U.S. Cl.
CPC .................. *G06V 10/764* (2022.01)

(58) Field of Classification Search
CPC ....... G06V 10/764; G06V 20/62; G06V 30/10
See application file for complete search history.

(56) References Cited

U.S. PATENT DOCUMENTS

| | | | |
|---|---|---|---|
| 6,446,011 B1 | 9/2002 | Floratos et al. | |
| 10,546,216 B1* | 1/2020 | Shachar | G06N 3/08 |
| 2006/0104532 A1* | 5/2006 | Messina | G06V 10/469 |
| | | | 382/253 |
| 2007/0067348 A1 | 3/2007 | Andreyev | |
| 2010/0329574 A1 | 12/2010 | Moraleda et al. | |
| 2014/0254864 A1* | 9/2014 | Dalal | G06V 40/20 |
| | | | 382/103 |
| 2015/0030238 A1 | 1/2015 | Yang et al. | |

(Continued)

FOREIGN PATENT DOCUMENTS

CN 112417938 A 2/2021

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — John B Strege
(74) *Attorney, Agent, or Firm* — CUENOT, FORSYTHE & KIM, LLC (57) ABSTRACT

Identifying an indistinct entity within an image can include generating by an image filter multiple gradients, each of which corresponds to one of a plurality of pixels of an image captured by an imager. The image can be searched for a likely repeating pattern. Responsive to detecting, based on the multiple gradients, a likely repeating pattern within the image, data structures can be generated, the data structures comprising a set of probabilistically weighted feature vectors corresponding to the likely repeating pattern. A machine learning model can classify each of the set of probabilistically weighted feature vectors. An identity of the likely repeating pattern can be output, the identity based on the machine learning model classifications of the probabilistically weighted feature vectors.

20 Claims, 5 Drawing Sheets

(56) References Cited

U.S. PATENT DOCUMENTS

2018/0285690 A1    10/2018   Goswami et al.
2020/0293820 A1     9/2020   Mathada et al.
2021/0118206 A1     4/2021   Bharadwaj et al.

OTHER PUBLICATIONS

Pratas, D. et al., "On the detection of unknown locally repeating patterns in images," In Int'l. Conf. Image Analysis and Recognition, Jun. 25, 2012, pp. 158-165, Springer, Berlin, Heidelberg.

Lettry, L. et al., "Repeated pattern detection using CNN activations," In 2017 IEEE Winter Conference on Applications of Computer Vision (WACV), Mar. 24, 2017, pp. 47-55, IEEE.

Epshtein, B. et al., "Detecting text in natural scenes with stroke width transform," In 2010 IEEE Computer Society Conference on Computer Vision and Pattern Recognition, Jun. 13, 2010, pp. 2963-2970, IEEE.

Grissisnger, M. et al., "Avoiding confusion with alphanumeric characters," Pharmacy and Therapeutics, Dec. 2012, vol. 37, No. 12, pp. 663, 665.

Mazza, C. "Numbers in simultaneous interpretation," 2001, 18 pg.

"Large Numbers," [online] Wikipedia, the Free Encyclopedia, Jun. 26, 2022, [retrieved Jul. 11, 2022], retrieved from the Internet: <https://en.wikipedia.org/wiki/Large_numbers>, 9 pg.

WIPO Appln. PCT/CN2023/092208, International Search Report and Written Opinion, Jun. 21, 2023, 8 pg.

* cited by examiner

PATTERN RECOGNITION FOR IDENTIFYING INDISTINCT ENTITIES

TECHNICAL FIELD

This disclosure relates to machine-implemented pattern recognition, and more particularly, to identifying indistinct objects within images.

BACKGROUND

Visual crowding is a perceptual phenomenon pertaining to the inability to recognize objects amid clutter. Clutter can render an object indistinct, meaning that there is a greater than negligible probability that an observer will not correctly identify or readily discern the presence of the object within a cluttered image. Visual crowding imposes a fundamental limit on the conscious visual perception and object recognition within a human being's visual field by impeding the observer's capability of recognizing an object presented away from the fovea—a tiny pit located in the macula of the observer's retina—owing to the presence of neighboring objects. Although sometimes associated with neuro psychiatric conditions (e.g., schizophrenia, autism), visual crowding also affects individuals not otherwise impaired by an underlying condition.

The effects of visual crowding can be especially pronounced if the individual is attempting to recognize characters within a group of objects (e.g., a string of zeros within a sequence of characters). For example, virtually everyone would struggle to count the number of zeros within a character string such as 10000000000000000000023, making it almost impossible to easily ascertain the value of the number represented. The plethora of zeros makes the other numbers difficult to discern—that is, the character string of integers is rendered an indistinct object within an image. The problem is typically worse if the character string is viewed on a computer display screen or display screen of another electronic device. The problem of visual crowding also worsens the farther the observer is from an object amid clutter.

SUMMARY

In one or more embodiments, a method for identifying entities within an image can include generating, by an image filter, a plurality of gradients, wherein each of the plurality of gradients corresponds to one of a plurality of pixels of an image captured by an imager. The method can include searching the image for a likely repeating pattern. Responsive to detecting, based on the plurality of gradients, a likely repeating pattern within the image, the method can include generating data structures comprising a set of probabilistically weighted feature vectors corresponding to the likely repeating pattern. The method can include classifying, by a machine learning model, each of the set of probabilistically weighted feature vectors. The method can include outputting, based on the classifying, an identity of the likely repeating pattern.

In one or more embodiments, a system for identifying entities within an image includes one or more processors configured to initiate operations. The operations can include generating, by an image filter, a plurality of gradients, wherein each of the plurality of gradients corresponds to one of a plurality of pixels of an image captured by an imager. The operations can include searching the image for a likely repeating pattern. Responsive to detecting, based on the plurality of gradients, a likely repeating pattern within the image, the operations can include generating data structures comprising a set of probabilistically weighted feature vectors corresponding to the likely repeating pattern. The operations can include classifying, by a machine learning model, each of the set of probabilistically weighted feature vectors. The operations can include outputting, based on the classifying, an identity of the likely repeating pattern.

In one or more embodiments, a computer program product includes one or more computer readable storage media having instructions stored thereon. The instructions are executable by a processor to initiate operations. The operations can include generating, by an image filter, a plurality of gradients, wherein each of the plurality of gradients corresponds to one of a plurality of pixels of an image captured by an imager. The operations can include searching the image for a likely repeating pattern. Responsive to detecting, based on the plurality of gradients, a likely repeating pattern within the image, the operations can include generating data structures comprising a set of probabilistically weighted feature vectors corresponding to the likely repeating pattern. The operations can include classifying, by a machine learning model, each of the set of probabilistically weighted feature vectors. The operations can include outputting, based on the classifying, an identity of the likely repeating pattern.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to machine-implemented pattern recognition, and more particularly, to identifying indistinct objects within images.

In accordance with the inventive arrangements disclosed herein, example methods systems, and computer program products are provided that are capable of identifying indistinct entities within images. The inventive arrangements disclosed can implement fast pattern recognition using a machine learning model trained to identify indistinct entities. As defined herein, "indistinct entity" means a visual image, or portion thereof, comprising characters that convey information but that are likely to be misconstrued or incomprehensible to a human observer.

Characters can comprise, for example, alphabetic characters drawn from a specific language, such as English, Chinese, (e.g., Pinyin) or other language. The characters, for example, can comprise numerical characters of a specific type, such as Arabic numbers, Roman numerals, or other numerical types. The characters, for example, can comprise logograms (e.g., Chinese characters or Japanese kanji) or other symbols that succinctly convey information. The characters, for example, can comprise coded representations such as QR codes, two-dimensional bar codes, or other coded representations.

A likelihood of confusion of an observer increases with the amount of repetition of the same or similar character, symbol, or object in close succession within a character string. As defined herein, "likelihood of confusion" means a probability greater than a predetermined threshold of incomprehensibility or misinterpretation of a string of characters by an observer, and accordingly, correlates with the amount of repetition of the same or similar character, symbol, or object in the string. Thus, if the repetition exceeds a predetermined threshold, then an image, or portion of an image, can be accurately characterized as an indistinct entity. The indistinct entity is thus a repeating pattern for which there is some predetermined probability that the pattern is incomprehensible or incorrectly interpreted by an observer or, depending on the application, another machine.

The inventive arrangements, for example, are thus capable of identifying an entity's characters occurring within a hard-to-interpret image comprising repeated patterns. In various arrangements, the target entity information (e.g., recognized characters) can be conveyed as input to one or more systems, thereby enhancing the visualization capabilities of the system(s).

In certain arrangements, a likely repeating pattern is detected within an image. The amount of repetition can be determined. The amount of repetition can correlate with a likelihood of confusion. If the amount of repetition exceeds a predetermined threshold correlation, then the arrangements are capable of identifying the repeating pattern. The identity can provide a succinct description of the repeating pattern. The identity can be a textual description. For example, the inventive arrangements can output an identity such as "1 trillion twenty-three," in response to classifying the numerical character string 1000000000023. Thus, the outputted identity provides a readily understandable prose description of the numerical character string.

One aspect of the inventive arrangements is a machine learning model having enhanced predictive accuracy for classifying one or more indistinct entities within an image. The enhanced predictive accuracy is obtained by training the model using a weighting methodology. The weighting methodology, in certain arrangements, is based on in-class variances of similar entities and between-class variances among different entity categories. The variances can be used to obtain a ratio, defined herein as a $\psi$-ratio, for weighting feature vector inputs to the machine learning model.

Identifying an indistinct entity, in accordance with some inventive arrangements, also can be based on an ascertained context of the information entity.

Another aspect of the inventive arrangements is the mitigating of ambiguity variance associated with information entities. In accordance with certain arrangements, ambiguity variance is reduced and/or controlled based on determining in-class and within class variances associated with an information entity.

Yet another aspect of the inventive arrangements is the generating of gradients for identifying information entities. The gradients, in accordance with the inventive arrangements, can be constructed as algebraic scalars. The algebraic scalars can be used to identify information entities comprising indistinct entity vectors.

Further aspects of the inventive arrangements disclosed within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
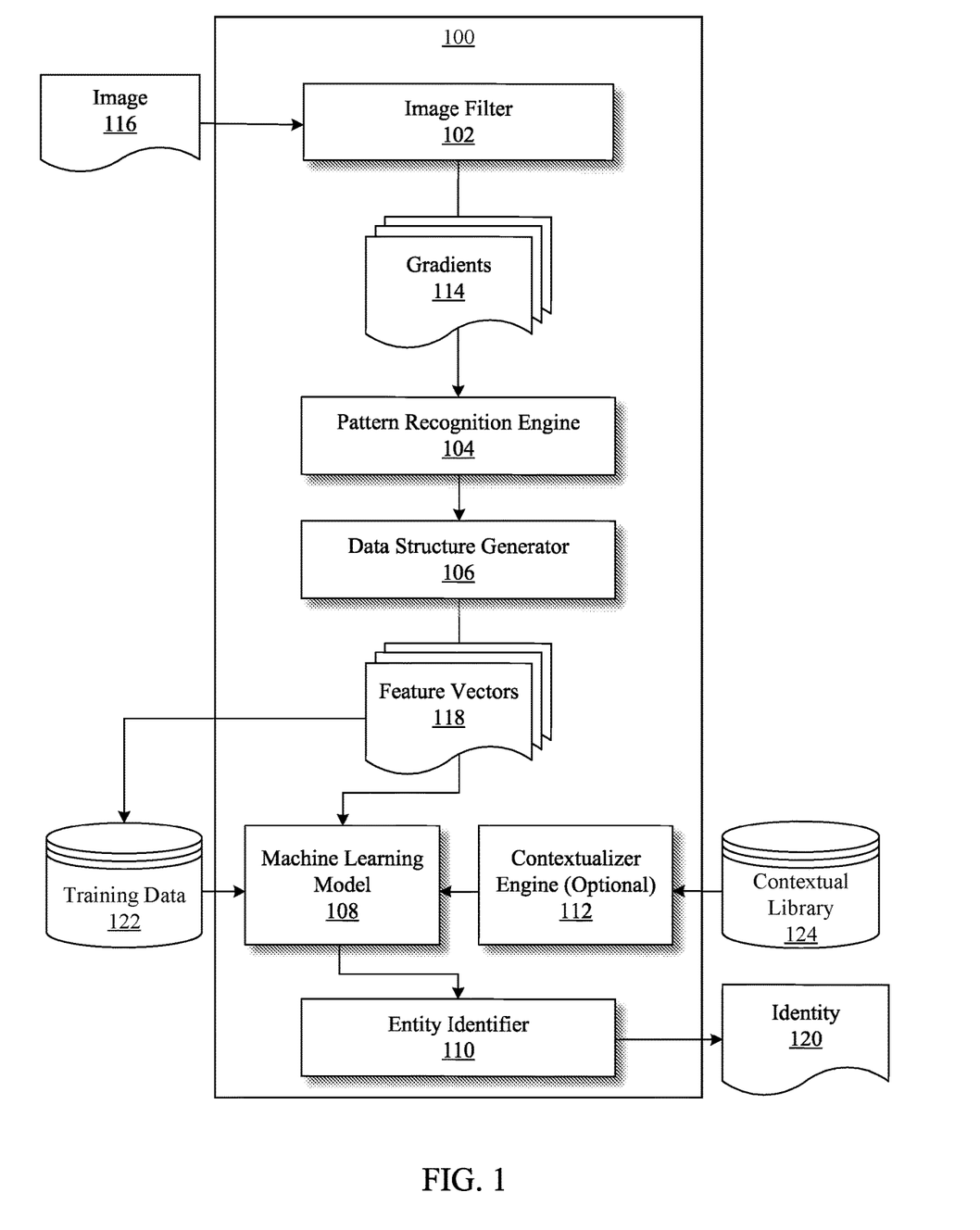
FIG. 1 illustrates an example system for identifying indistinct entities in an image.
Figure 2:
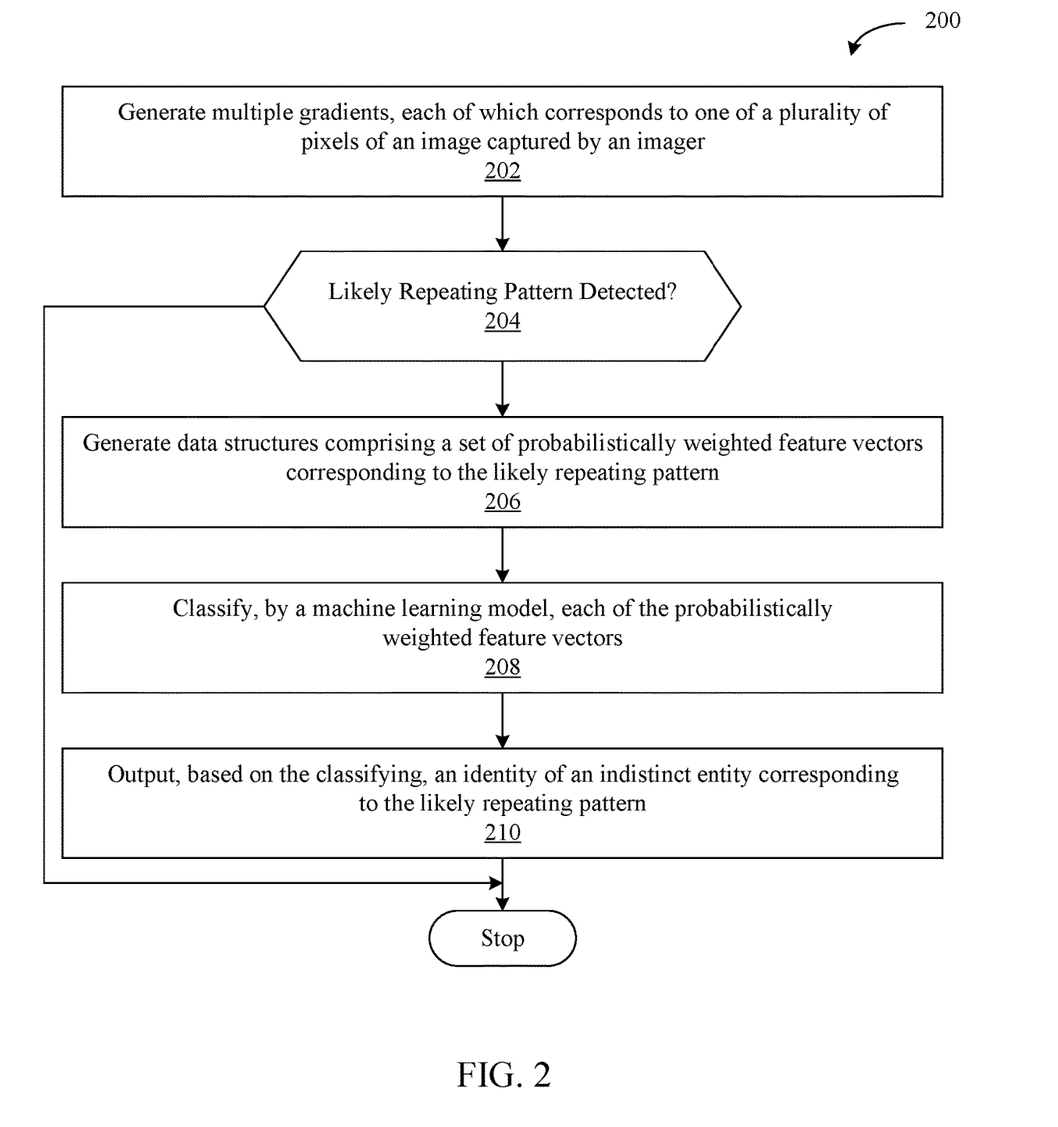
FIG. 2 illustrates certain methodological aspects of using the system of FIG. 1.
Figure 5:
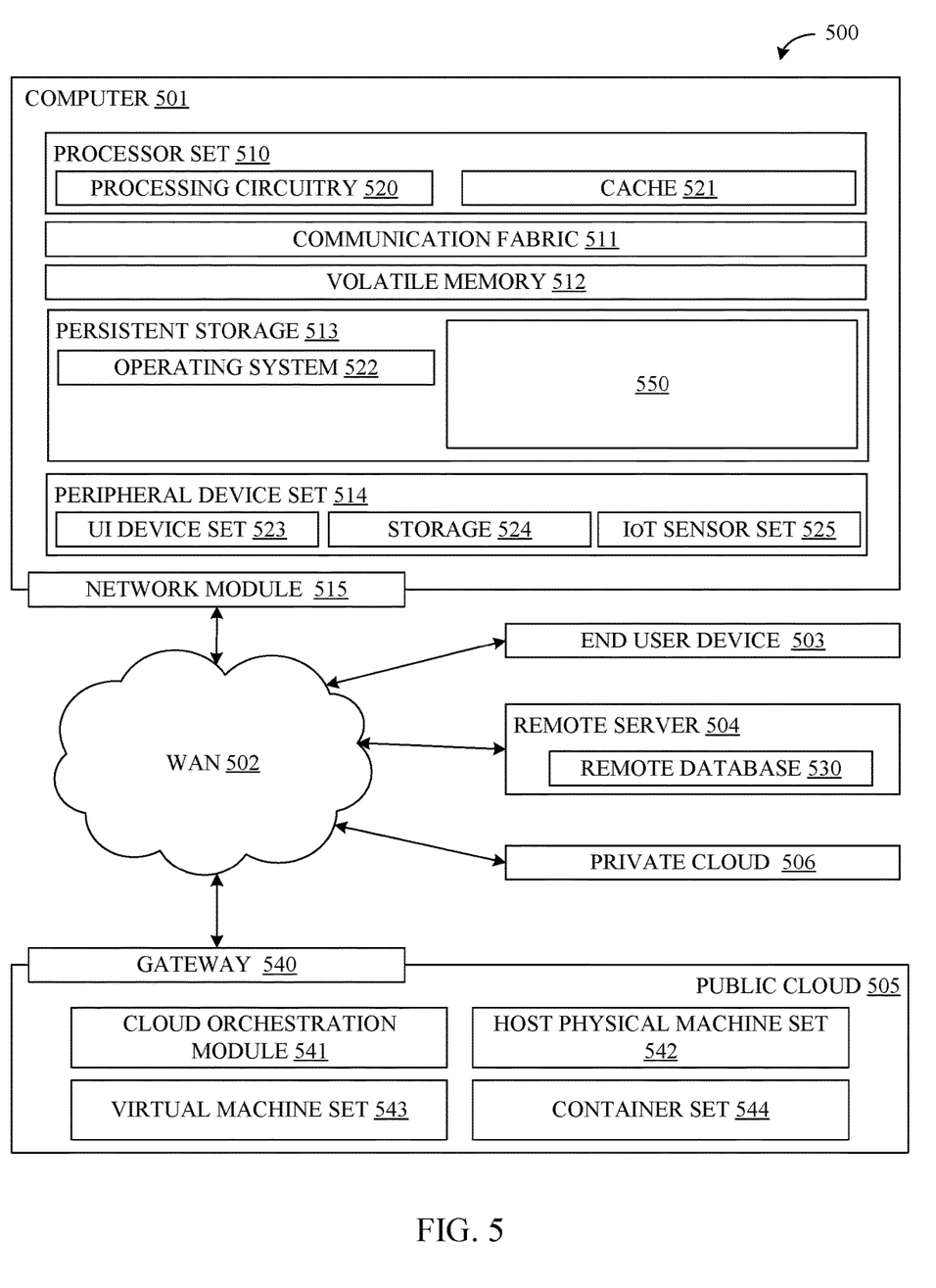
FIG. 5 illustrates an example computing environment for implementing aspects of the system of FIG. 1.

Referring initially to FIGS. 1 and 2, an example system for identifying indistinct image entities (system) 100 and a methodology 200 of implementing certain operative aspects of the disclosure are illustrated. System 100, in accordance with certain arrangements, illustratively includes image filter 102, pattern recognition engine 104, data structure generator 106, machine learning model 108, and entity identifier 110. Optionally, system 100 includes contextualizer engine 112. In various arrangements, image filter 102, pattern recognition engine 104, data structure generator 106, machine learning model 108, entity identifier 110, and optional contextualizer engine 112 can be implemented in hardware (e.g., dedicated hardwired circuitry), software (e.g., program code executed by one or more processors), or a combination thereof. For example, system 100 in certain embodiments may be implemented in computer-readable program instructions loaded onto a computer, such as computer 501 of computing environment 500 (FIG. 5).

Operatively, at block 202, image filter 102 is capable of generating multiple gradients 114, each gradient corresponding to a pixel of image 116. Image 116, in various arrangements, can be an image captured by imager, such as a camera or other device capable of generating images. Image 116 is received by a device (e.g., computer) in which system 100 is implemented. Each gradient generated by image filter 102 is capable of measuring a change in the intensity and/or color at corresponding pixel of image 116. Mathematically, each gradient at a corresponding pixel is a two-element vector whose components are a partial derivative in a horizontal direction of image 116 and a partial derivative in a vertical direction of image 116. The direction of a gradient at each pixel of image 116 points in the direction of the greatest increase in intensity at the corresponding pixel, and the magnitude of the gradient indicates a rate of change in intensity at the pixel. Optionally, image filter 102 also can be configured to normalize image 116 by changing the intensity values of each of the pixels. Image filter 102 also can be optionally configured to remove a background of image 116.

At block 204, pattern recognition engine 104 is capable of detecting one or more likely occurrences of a repeating pattern that may occur within image 116. Pattern recognition engine detects a likely repeating pattern within image 116 based on gradients 114. In certain arrangements, the magnitudes of gradients 114 provide a histogram. Pattern recognition engine 104 can be configured to interpret the histogram as a discretized approximation of a probability density function (e.g., approximate Gaussian distribution). The probabilities can indicate the likelihood that a pixel is one of a group of pixels corresponding to a repeating pattern. A region of image 116 in which the gradients indicate a certain pixel intensity (e.g., greater than a predetermined probability threshold) can be identified by pattern recognition engine 104 as corresponding to a likely repeating pattern.

The likely repeating pattern may comprise the sequence of characters of an indistinct entity. A repeating pattern, for example, can correspond to an indistinct entity if there is a likelihood (e.g., a probability greater than predetermined threshold of 0.67 or higher) that a user misconstrues or fails to correctly comprehend a correct meaning of the characters of the repeating pattern.

In certain arrangements, at block 204, pattern recognition engine 104 detects a likely repeating pattern based on the magnitudes and directions of gradients 114 generated at block 202. Given that image data is discrete, pattern recognition engine 104 can determine the magnitude of each gradient by taking the square root of the sum of the finite differences $\Delta\mu$ and $\Delta v$ determined as follows:

$$\{f(x,y)= \sqrt{(\Delta u)^2 + (\Delta v)^2}\}_{\exists g(x,y)\in \mathbb{R}} \quad \text{EQ. (1)}$$

where $\Delta\mu = g(x+1, y+1) - g(x, y)$ and $\Delta v = g(x+1, y) - g(x, y+1)$.

In certain arrangements, pattern recognition engine 104 determines a direction of incidence of a repeating pattern based on the directions of the gradients at each pixel corresponding to the repeating pattern. A gradient direction $\varepsilon(x, y)$ relative to a horizontal x-axis at pixel location (x, y) is determined as follows:

$$\left\{\varepsilon(x, y) = \tan^{-1}\frac{\Delta u}{\Delta v}\right\}_{\exists g(x,y)\in\mathbb{R}} \quad \text{EQ. (2)}$$

where $\Delta u = g(x+1, y+1) - g(x, y)$ and $\Delta v = g(x+1, y) - g(x, y+1)$.

System 100 optionally can include one or more image processing units (not shown explicitly) operating cooperatively with pattern recognition 104 and having capabilities to normalize image 116. The image processing unit(s), based on $\varepsilon(x, y)$, can linearize any patterns that appear angled relative to the horizontal x-axis.

Pattern recognition engine 104 can be trained to detect a likely class of discrete characters (e.g., alphabetic characters, numerical characters) that may be present in the likely repeating pattern within a region of image 116. The information provided by the gradients of the region is extracted by pattern recognition engine 104. Although pattern recognition engine 104's identification of a likely repeating pattern may be a false positive, the likelihood of such false positives is mitigated by subsequent classifying performed with machine learning model 108, as described in greater detail below.

If at block 204, based on gradients 114, pattern recognition engine 104 detects a likely repeating pattern, then pattern recognition engine 104 provides the information extracted to data structure generator 106. Data structure generator 106 is capable of generating data structures that comprise a set of probabilistically weighted feature vectors, the feature vectors and weights based on the information extracted from gradients 114 by pattern recognition engine 104.

At block 206, data structure generator 106 generates data structures comprising probabilistically weighted feature vectors 118 that correspond to possible, but not yet identified, characters of the likely repeating pattern detected at block 204. Probabilistically weighted feature vectors 118 are input to machine learning model 108.

At block 208, machine learning model 108 is capable of classifying each of probabilistically weighed feature vectors 118. Machine learning model 108, configured as machine learning classifier, is trained using feature vectors modified by weighting each element of the feature vectors used for training. The feature weighting enhances the predictive accuracy of machine learning model 108.

At block 210, based on machine learning model 108's classifying each of the probabilistically weighted feature vectors, entity identifier 110 is capable of outputting identity 120. Identity 120 corresponds to the likely repeating pattern, now identified with a predetermined level of confidence as almost certainly a repeating sequence of same or visually similar characters. Identity 120 can comprise a textual description. The textual description, for example, can describe in prose a repeating pattern of letters, numbers, or other characters. Identity 120 can be a succinct description of the repeating pattern, a description that is more readily understandable to a user. For example, identity 120 can respond to a long string of characters, such as "aaaaaaaaaaaaaaaaaaaaaaa", with the textual description "the English letter 'a' repeats 23 times."

Figure 3:
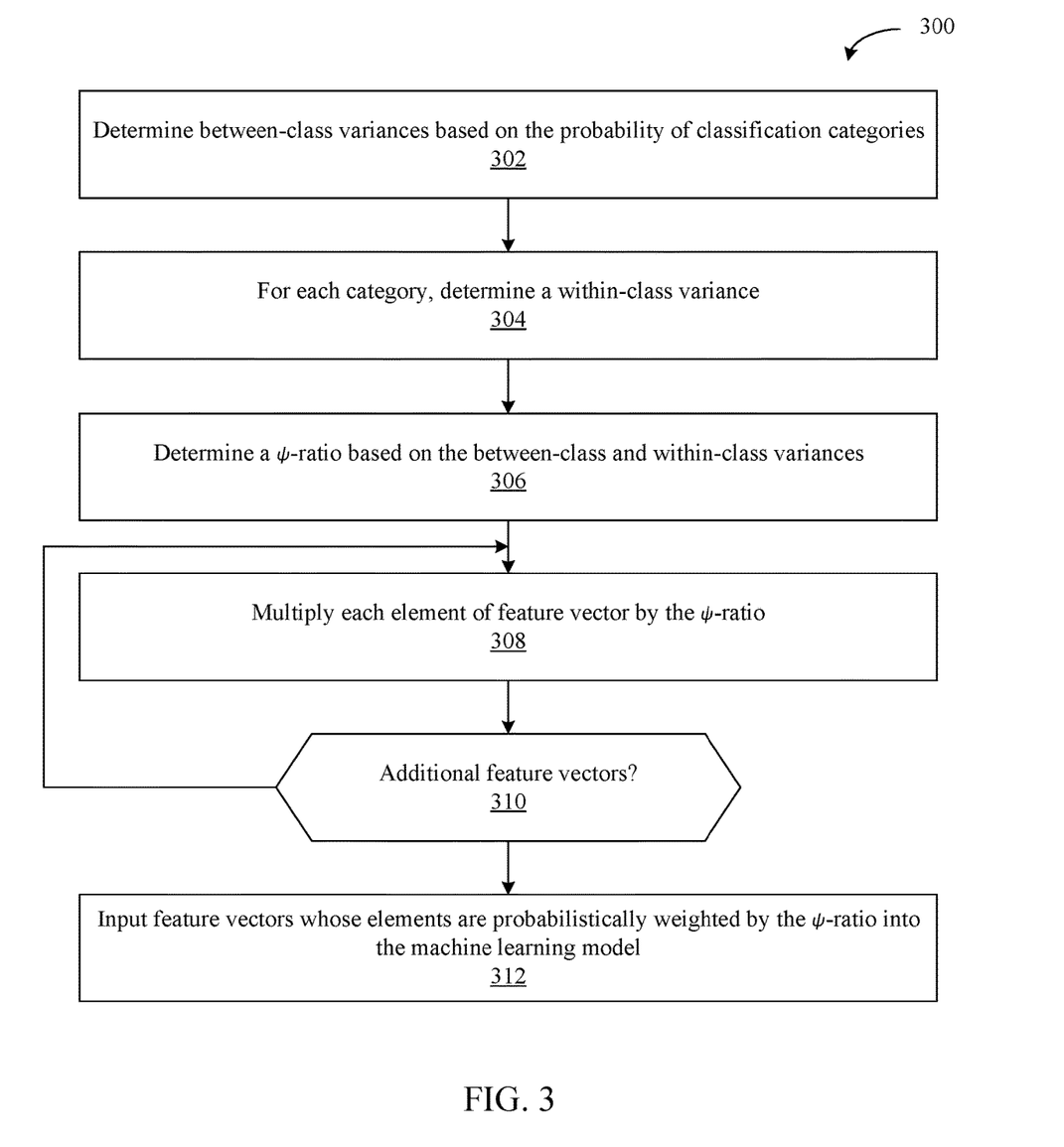
FIG. 3 illustrates an example method of generating data structures comprising probabilistically weighted feature vectors for input to a machine learning model of FIG. 1.

FIG. 3 illustrates an example method 300 of generating data structures comprising probabilistically weighted feature vectors, in accordance with certain arrangements. Method 300 can be performed by a data structure generator, such as data structure generator 106, for generating probabilistically weighted feature vector inputs to a machine learning model, such as machine learning model 108. A probabilistically weighted feature vector is generated for each character potentially within a likely repeating pattern.

In accordance with method 300, the data structure generator determines between-class variances and within-class variances based on probabilities for each of a plurality of classification categories. The classification categories, for example, can include a classification category corresponding to alphabetic characters of a predetermined language. The classification categories, for example, can include numerical characters. In various arrangements, depending on a specific application or task, the plurality of classification categories can include different combinations of various classification categories.

At block 302, for example classification category $\mathbb{C}_D$, the data structure generator determines the between-class variance $\eta_{bi}^{\alpha}$ of dimension a based on a probability $$P(\mathbb{C}_D) = \int \frac{N_{\mathbb{C}}}{\Sigma N_{\mathbb{C}}},$$

where $N_{\mathbb{C}}$ denotes a plurality of samples of a likely repeating pattern. The between-class variance $\eta_{bi}^{a}$ is determined as follows:

$$\eta_{bi}^{a} = \Sigma_{D=1}^{a} P(\mathbb{C}_D)[E\{\varepsilon_i - z_D\}^2], \qquad \text{EQ. (3)}$$

where $a \in \mathbb{R}$, and $\mathbb{C} \geq \alpha$, and $z_D = E\{w_i | \mathbb{C}_D\}$.

At block 304, the data structure generator determines for example classification category $\mathbb{C}_D$ a within-class variance $\eta_{wi}^{b}$ of dimension b as follows:

$$\eta_{wi}^{b} = \Sigma_{D=1}^{b} P(\mathbb{C}_x)[E\{z_i - z_D\}^2], \qquad \text{EQ. (4)}$$

where $b \in \mathbb{R}$, $\mathbb{C} \geq b$, and $z_i = \Sigma_{D=1}^{b} P(\mathbb{C}_D)$.

At block 306, the system determines ψ-ratio based on the between-class and in-class variances:

$$\psi = \frac{\eta_{bi}^a}{\eta_{wi}^b}$$

At block 308, the system multiplies each element $z_i$ of feature vector {Z} by the ψ-ratio to obtain a corresponding weighted feature vector {W}. Accordingly, $$\{W\} = \{Z\} \cdot \psi. \qquad \text{EQ. (5)}$$

At block 310, the system determines whether there remains one or more other feature vectors for probabilistically weighting. If so, the operations at block 308 are repeated. Otherwise, method 300 continues at block 312 by inputting the probabilistically weighted feature vectors into a machine learning model.

The machine learning model, such as machine learning model 108, can be trained to classify target feature vectors (configured as probabilistically weighted feature vectors). A target feature vector is classified based on a value ascribed to an object, such as an English letter's ASCII value, for example. The resolved classification value is an eigenvalue, which is classified by the machine learning model according to the following function:

$$(n-1)\ln(\alpha) + \sum_{i=1}^{K} \ln\left[\lambda_i + \frac{N_o}{N}\sigma^2\right]. \qquad \text{EQ. (6)}$$

where K is the number of eigenvalues; $\lambda_i$ is the i-th eigenvalue that satisfies the covariance matrix $\Sigma$ of the sample feature vectors; n is vector size (number of elements); $\sigma^2$ is a population variance, $N_0$ is the number of feature vector samples of a specific class, and N is the total number of feature vector samples.

The covariance matrix $\Sigma$ is a real, symmetric matrix. Accordingly, the eigenvalues of the covariance matrix will be real, and its eigenvectors can be chosen to form an orthonormal set. The eigenvalues can be generated by eigendecomposition or Cholesky decomposition of the covariance matrix $\Sigma$.

The term a is a representational error that is determined as follows:

$$\alpha \approx \frac{[\|\{W\} - \{M\}\|^2]}{\frac{N_o}{N}\sigma^2}.$$

where {W} is the weighted feature vector and {M} is a mean vector.

An iterative training algorithm attempts to minimize representational error a to achieve an acceptable level of classification accuracy for the machine learning model.

Referring again to FIGS. 1 and 2, machine learning model 108 is trained using training data 122. Training data 122 comprises labeled feature vectors of repeating patterns. The feature vectors used for training machine learning model 108 are probabilistically weighted feature vectors. Each element of the labeled feature vectors comprising training data 122 is weighted, in accordance with certain arrangements, based on a ψ-ratio. The ψ-ratio is determined during training machine learning model 108. The ψ-ratio is determined from feature vectors that belong to the similar classes and is computed for each element of the labeled feature vectors. The higher an element's ψ-ratio, the greater the information content provided by the element for assigning a repeating pattern to a class.

In certain arrangements, optional contextualizer engine 112 is capable of determining one or more contextual features of an image. Contextualizer engine 112 is capable of adding each identified contextual features to the feature vectors generated by data structure generator 106 for input to machine learning model 108. The contextual features can be generated by contextualizer engine 112 from individual characters or character strings having predetermined meanings. Illustratively, contextualizer engine 112 can retrieve prestored contextual features from contextual library 124. For example, contextualizer engine 112 in certain applications can determine whether characters are likely English language letters, Chinese characters, Roman numerals, Arabic numbers, or another type of character.

Figure 4:
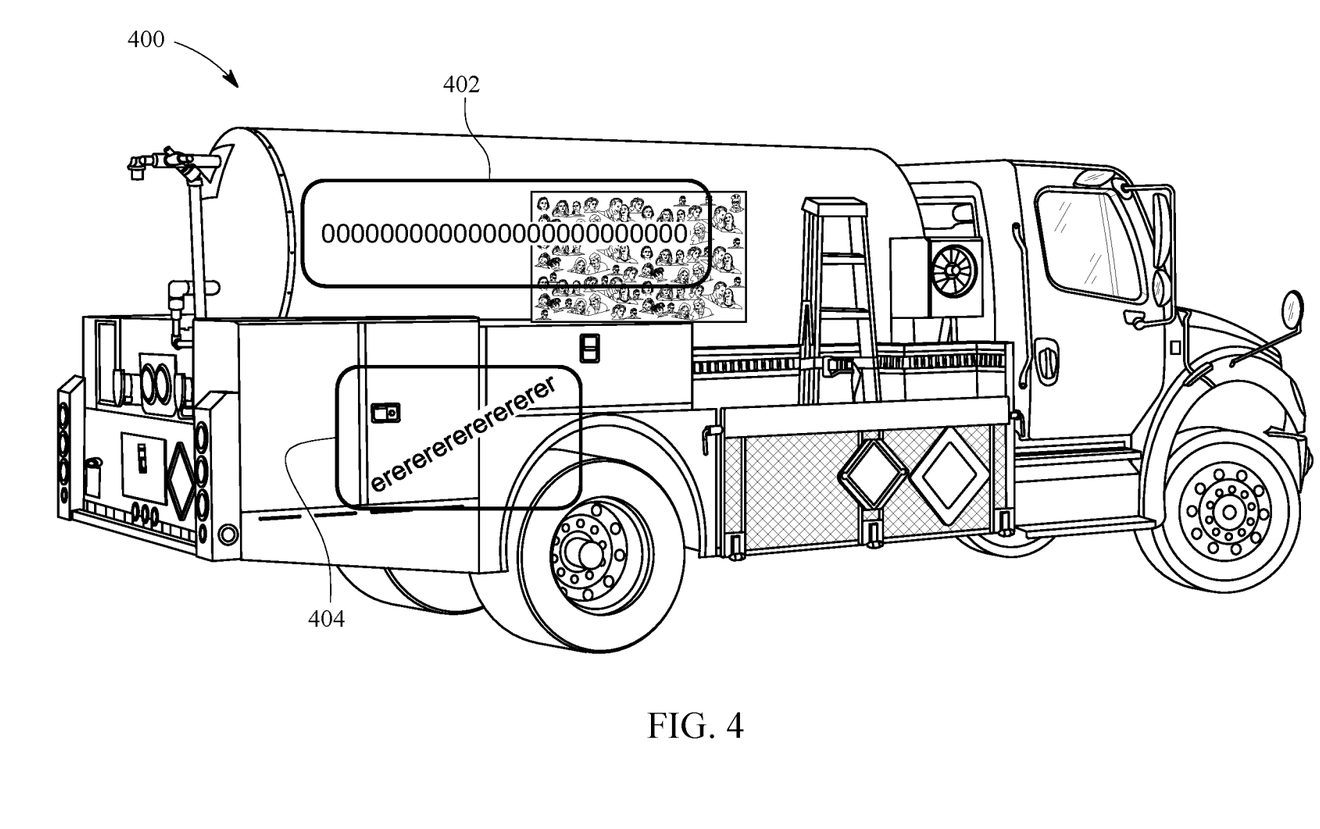
FIG. 4 illustrates certain operative aspects of the system of FIG. 1

FIG. 4 illustrates certain operative aspects of system 100 with respect to example image 400. System 100 uses ψ-ratio modified feature vectors to superimpose weighted features to identify sampled patterns. Illustratively, repeating pattern 402 and repeating pattern 404 are sampled patterns. System 100 is capable of identifying the box-enclosed entities corresponding to repeating patterns 402 and 404. The entities are identified in accordance with above-described operations performed by system 100.

In scenarios in which pattern recognition 104 determines that a repeating pattern comprises a string of integers, such as repeating pattern 402, entity identifier 110 outputs an identity that clarifies the repeating pattern or presents a more comprehensible version of the pattern. For example, based on machine learning model 108's classifying probabilistically weighted feature vectors corresponding to repeating pattern 402, entity identifier 110 outputs an identity that is the textual description, "zero repeats twenty-five times." In other such scenarios, entity identifier 110 outputs a textual or exponential representation of a value corresponding to the string of integers. For example, if the repeating pattern is identified as comprising a character string such as 1000000000, entity identifier 110 outputs an identity that reads "1 billion" or "1×10⁹."

If a likely repeating pattern comprises a string of alphabetic characters such as illustrated by repeating pattern 404, entity identifier 110 can output an identity that comprises a single pattern of the likely repeating pattern plus an indication of the number of times the single pattern occurs within the repeating pattern. For example, with respect to repeating pattern 404, identity 120 can be the prose description, "er repeats nine times."

In still other scenarios in which the likely repeating pattern comprises a string of alphabetic characters, entity identifier 110 can output an identity that indicates the language from which the alphabetic characters are drawn.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code involved in performing the inventive methods, such as identifying indistinct image entities, is illustrated at block 550. The inventive methods performed with the computer code of block 550 can include generating data structures comprising a set of probabilistically weighted feature vectors corresponding to a likely repeating pattern, classifying the probabilistically weighted feature vectors with a machine learning model, and outputting an identity of the likely repeating pattern based on the classifying, as described herein in the context of system 100 and methodology 200. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction paths that allow the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (e.g., where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (e.g., embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (e.g., a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise, the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "end user" is a human being.

The terms first, second, etc. may be used herein to describe various elements. These elements should not be limited by these terms, as these terms are only used to distinguish one element from another unless stated otherwise or the context clearly indicates otherwise.

The inventive arrangements disclosed herein have been presented for purposes of illustration and are not intended to be exhaustive or limited to the specific ones disclosed. Many modifications and variations will be apparent to those of ordinary skill in the art without departing from the scope and spirit of the described inventive arrangements. The terminology used herein was chosen to best explain the principles of the inventive arrangements, the practical application or technical improvement over technologies found in the marketplace, or to enable others of ordinary skill in the art to understand the inventive arrangements disclosed herein.

What is claimed is:

1. A computer-implemented method, comprising:
    generating, by an image filter of a computer, a plurality of gradients, wherein each of the plurality of gradients corresponds to one of a plurality of pixels of an image captured by an imager and received by the computer;
    searching the image, by a pattern recognition engine of the computer, for a likely repeating pattern within the image;
    responsive to detecting, based on the plurality of gradients, the likely repeating pattern within the image, generating a set of probabilistically weighted feature vectors corresponding to the repeating pattern;
    classifying, by a machine learning model, each of the set of probabilistically weighted feature vectors; and
    outputting, based on the classifying, an identity of the repeating pattern.

2. The computer-implemented method of claim 1, further comprising:
    determining an amount of repetition of the likely repeating pattern; and
    performing the outputting in response to the amount of repetition exceeding a predetermined threshold correlation with a likelihood of confusion.

3. The computer-implemented method of claim 1, wherein the generating a set of probabilistically weighted vectors includes determining a set of feature-weighting probabilities based on a ratio of between-class variances and within-class variances of the set of probabilistically weighted feature vectors.

4. The computer-implement method of claim 1, wherein the detecting includes detecting that the likely repeating pattern comprises a sequence of characters, wherein the characters include at least one of an alphabetic character, a numerical character, or a code-based character.

5. The computer-implemented method of claim 1, wherein the likely repeating pattern comprises a string of integers and the identity comprises a textual representation of a value corresponding to the string of integers.

6. The computer-implemented method of claim 1, wherein the likely repeating pattern comprises a string of alphabetic characters and the identity comprises a single pattern of the likely repeating pattern plus an indication of a number of times the single pattern occurs within the likely repeating pattern.

7. The computer-implemented method of claim 1, wherein the likely repeating pattern comprises a string of alphabetic characters and the identity indicates a language from which the alphabetic characters are drawn.

8. A system, comprising:
a processor configured to initiate operations including:
generating, by an image filter, a plurality of gradients, wherein each of the plurality of gradients corresponds to one of a plurality of pixels of an image captured by an imager;
searching the image for a likely repeating pattern within the image;
responsive to detecting, based on the plurality of gradients, the likely repeating pattern within the image, generating a set of probabilistically weighted feature vectors corresponding to the likely repeating pattern;
classifying, by a machine learning model, each of the set of probabilistically weighted feature vectors; and
outputting, based on the classifying, an identity of the likely repeating pattern.

9. The system of claim 8, wherein the processor is configured to initiate operations further including:
determining an amount of repetition of the likely repeating pattern; and
performing the outputting in response to the amount of repetition exceeding a predetermined threshold indicating the likely repeating pattern is correlated with a likelihood of confusion.

10. The system of claim 8, wherein the generating a set of probabilistically weighted vectors includes determining a set of feature-weighting probabilities based on a ratio of between-class variances and within-class variances of the set of probabilistically weighted feature vectors.

11. The system of claim 8, wherein the detecting includes detecting that the likely repeating pattern comprises a sequence of characters, wherein the characters include at least one of an alphabetic character, a numerical character, or a code-based character.

12. The system of claim 8, wherein the likely repeating pattern comprises a string of integers and the identity comprises a textual representation of a value corresponding to the string of integers.

13. The system of claim 8, wherein the likely repeating pattern comprises a string of alphabetic characters and the identity comprises a single pattern of the likely repeating pattern plus an indication of the number of times the single pattern occurs within the likely repeating pattern.

14. A computer program product, the computer program product comprising:
one or more computer-readable storage media and program instructions collectively stored on the one or more computer-readable storage media, the program instructions executable by a processor to cause the processor to initiate operations including:
generating, by an image filter, a plurality of gradients, wherein each of the plurality of gradients corresponds to one of a plurality of pixels of an image captured by an imager;
searching the image for a likely repeating pattern within the image;
responsive to detecting, based on the plurality of gradients, the likely repeating pattern within the image, generating a set of probabilistically weighted feature vectors corresponding to the likely repeating pattern;
classifying, by a machine learning model, each of the set of probabilistically weighted feature vectors; and
outputting, based on the classifying, an identity of the likely repeating pattern.

15. The computer program product of claim 14, wherein the program instructions are executable by the processor to cause the processor to initiate operations further including:
determining an amount of repetition of the likely repeating pattern; and
performing the outputting in response to the amount of repetition exceeding a predetermined threshold indicating the likely repeating pattern is correlated with a likelihood of confusion.

16. The computer program product of claim 14, wherein the generating a set of probabilistically weighted vectors includes determining a set of feature-weighting probabilities based on a ratio of between-class variances and within-class variances of the set of probabilistically weighted feature vectors.

17. The computer program product of claim 14, wherein the detecting includes detecting that the likely repeating pattern comprises a sequence of characters, wherein the characters include at least one of an alphabetic character, a numerical character, or a code-based character.

18. The computer program product of claim 14, wherein the likely repeating pattern comprises a string of integers and the identity comprises a textual representation of a value corresponding to the string of integers.

19. The computer program product of claim 14, wherein the likely repeating pattern comprises a string of alphabetic characters and the identity comprises a single pattern of the likely repeating pattern plus an indication of the number of times the single pattern occurs within the likely repeating pattern.

20. The computer program product of claim 14, wherein the likely repeating pattern comprises a string of alphabetic characters and the identity indicates the language from which the alphabetic characters are drawn.

* * * * *